United States Patent [19]
Ishihara et al.

[11] Patent Number: 5,175,063
[45] Date of Patent: Dec. 29, 1992

[54] FUEL CELL GENERATOR

[75] Inventors: Takeshi Ishihara, Toyoake; Keiji Matsuhiro, Nagoya, both of Japan

[73] Assignee: NGK Insulators, Ltd., Japan

[21] Appl. No.: 584,071

[22] Filed: Sep. 18, 1990

[30] Foreign Application Priority Data

Sep. 18, 1989 [JP] Japan .................................. 1-239918
Sep. 18, 1989 [JP] Japan .................................. 1-239919

[51] Int. Cl.⁵ .............................................. H01M 8/10
[52] U.S. Cl. .................................... 429/32; 429/34; 429/38; 429/39
[58] Field of Search ................ 429/32, 34, 38, 39

[56] References Cited

U.S. PATENT DOCUMENTS

| | | |
|---|---|---|
| 3,377,203 | 4/1968 | Möbius et al. |
| 4,510,212 | 4/1985 | Fraioli .............................. 429/38 X |
| 4,699,852 | 10/1987 | Yokoyama et al. ................ 429/31 |
| 4,833,045 | 5/1989 | Pollack et al. ..................... 429/31 |
| 4,895,576 | 1/1990 | Pal et al. ........................... 429/31 |
| 5,009,763 | 4/1991 | Hise .................................. 429/31 |

FOREIGN PATENT DOCUMENTS

| | | |
|---|---|---|
| 0055016 | 6/1982 | European Pat. Off. .............. 429/31 |
| 320087 | 7/1988 | European Pat. Off. |
| 410796 | 7/1990 | European Pat. Off. |
| 1004345 | 1/1962 | United Kingdom . |
| 1490650 | 12/1975 | United Kingdom . |
| 1482895 | 3/1976 | United Kingdom . |

*Primary Examiner*—Karl Group
*Attorney, Agent, or Firm*—Parkhurst, Wendel & Rossi

[57] ABSTRACT

A fuel cell generator including a fuel cell battery element including a plurality of fuel cell battery elements each utilizing a solid electrolyte, first and second power generating rooms, an oxidizing gas supply path, a fuel gas supply path, a construction member having a member including the oxidizing gas supply path and/or a member including the fuel gas supply path, and first and second current collecting members. In the fuel cell generator according to the invention, a fragile solid electrolyte member is supported by the first and second current collecting members, and an oxidizing gas and a fuel gas are respectively introduced into the first power generating room and the second power generating room through the oxidizing gas supply path and the fuel gas supply path at its center portion.

4 Claims, 10 Drawing Sheets

FIG_1

FIG_3

FIG_4

FIG_6

FIG_8

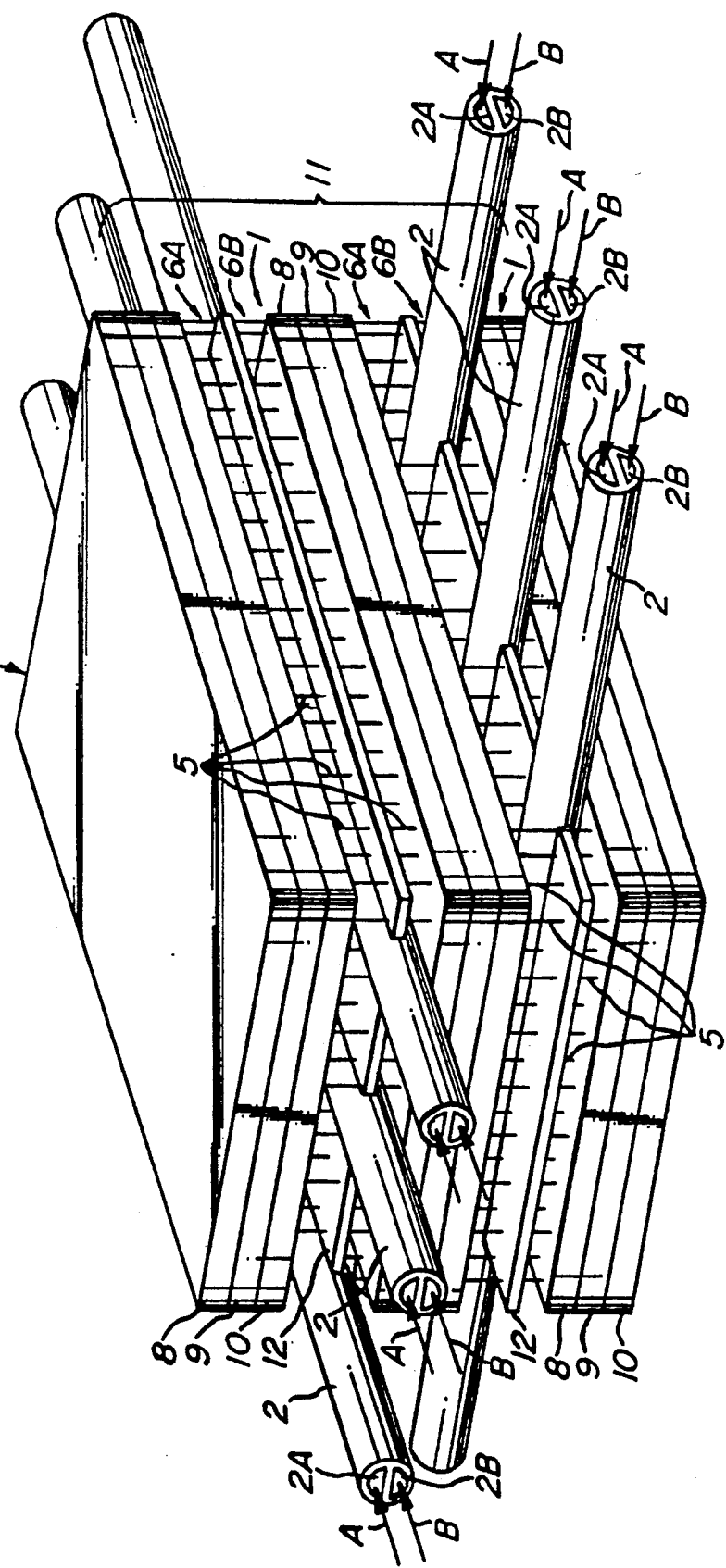

FUEL CELL GENERATOR

BACKGROUND OF THE INVENTION

1. Field of the Invention

The present invention relates to a fuel cell generator using a solid-electrolyte having an ion conductivity.

2. Related Art Statement

Recently, a fuel cell has been studied as an electric generator. This fuel cell generator can convert an chemical energy directly into an electric energy, and thus there is no limitation of Carnot cycle. Therefore, a high energy converting efficiency can be realized, and various fuels such as naphtha, natural as, methanol, coal improved gas, heavy oil, etc. can be utilized. Further, generation of public nuisance is low, and power generating efficiency is not varied corresponding to a size of the apparatus.

Since a fuel cell utilizing a solid-electrolyte i.e. solid oxide fuel cell (hereinafter, abbreviated as SOFC) can be used at high temperatures such as 1000° C., an electrode reaction is extremely active, and it is not necessary to use an expensive precious metal such as platinum. Moreover, in the SOFC, since polarization is low and a generated output voltage is relatively high, an energy converting efficiency become extremely higher as compared with the other fuel cell. Further, since all the members constructing the SOFC are solid members, a safety SOFC having a long life can be obtained.

An SOFC element comprises generally air electrodes, solid-electrolyte members, and fuel electrodes. A plate-like SOFC element has a large effective area fraction per unit volume as a cell, and thus it is desirable for the SOFC. There is known a fuel cell generator comprising a plurality of plate-like SOFC elements arranged parallelly and power generating rooms formed rigidly in a sealed manner between the SOFC elements, wherein oxygen gas and fuel gas are supplied from one end side of respective power generating rooms and burnt exhaust gas is discharged from the other end side of the power generating rooms.

However, in the fuel cell generator mentioned above wherein respective unit SOFC elements are sealed rigidly with each other, since respective unit SOFC elements are restricted with each other to form an airtight power generating room, stresses are generated at edge portions of the unit SOFC element, and thermal stresses due to high temperatures during the operation are enlarged by this restriction. Moreover, an electrode reaction is active in the vicinity of a fuel gas supply inlet and thus a temperature is high, but it is inactive in the vicinity of a fuel gas discharge outlet and thus a temperature is low. Therefore, a large temperature gradient is generated in the power generating room, and thus large thermal stresses are generated. These stresses generate cracks in the fragile SOFC element, and as a result, a power generating efficiency is lowered and a cell collector starts to be broken.

SUMMARY OF THE INVENTION

An object of the invention is to provide a fuel cell generator which can minimize generation of stresses in a unit SOFC element and a temperature gradient within a power generating room, thereby obtaining a uniform power generating efficiency.

According to the invention, the fuel cell generator comprises:

a fuel cell battery element array including a plurality of fuel cell elements arranged spaced from each other, each of which has at least a plate-like solid-electrolyte partition having an ion conductivity, an air electrode arranged on said partition at one side, and a fuel electrode arranged on said partition at the other side;

a first power generating room facing said air electrode;

a second power generating room facing to said fuel electrode;

an oxidizing gas supply path having an oxidizing gas supply inlet gas in said first power generating room preferably at its center portion and for supplying an oxidizing gas into said first power generating room through said oxidizing gas supply inlet;

a fuel gas supply path having a fuel gas supply inlet open in said second power generating room preferably at its center portion and for supplying a fuel gas into said second power generating room through said fuel gas supply inlet;

a construction member having a member including said oxidizing gas supply path and/or a member including said fuel gas supply path;

a first multi-contact current collecting member contacted across the substantially whole surface of said air electrode and at least connected electrically to said member including said oxidizing gas supply path; and a second multi-contact current collecting member contacted across the substantially whole surface of said fuel electrode and at least connected electrically to said member including said fuel gas supply path.

In the present invention, a term "contacted across the substantially whole electrode surface" includes not only a meaning such that completely whole electrode surface is contacted but also a meaning such that a part of the electrode surface remains uncontacted and substantially whole electrode surface other than the above uncontacted part is contacted.

BRIEF DESCRIPTION OF THE DRAWING

FIG. 10 is a partly cross-sectional perspective view illustrating a part of the other SOFC power generator according to the invention.

DESCRIPTION OF THE PREFERRED EMBODIMENTS

Figure 1:
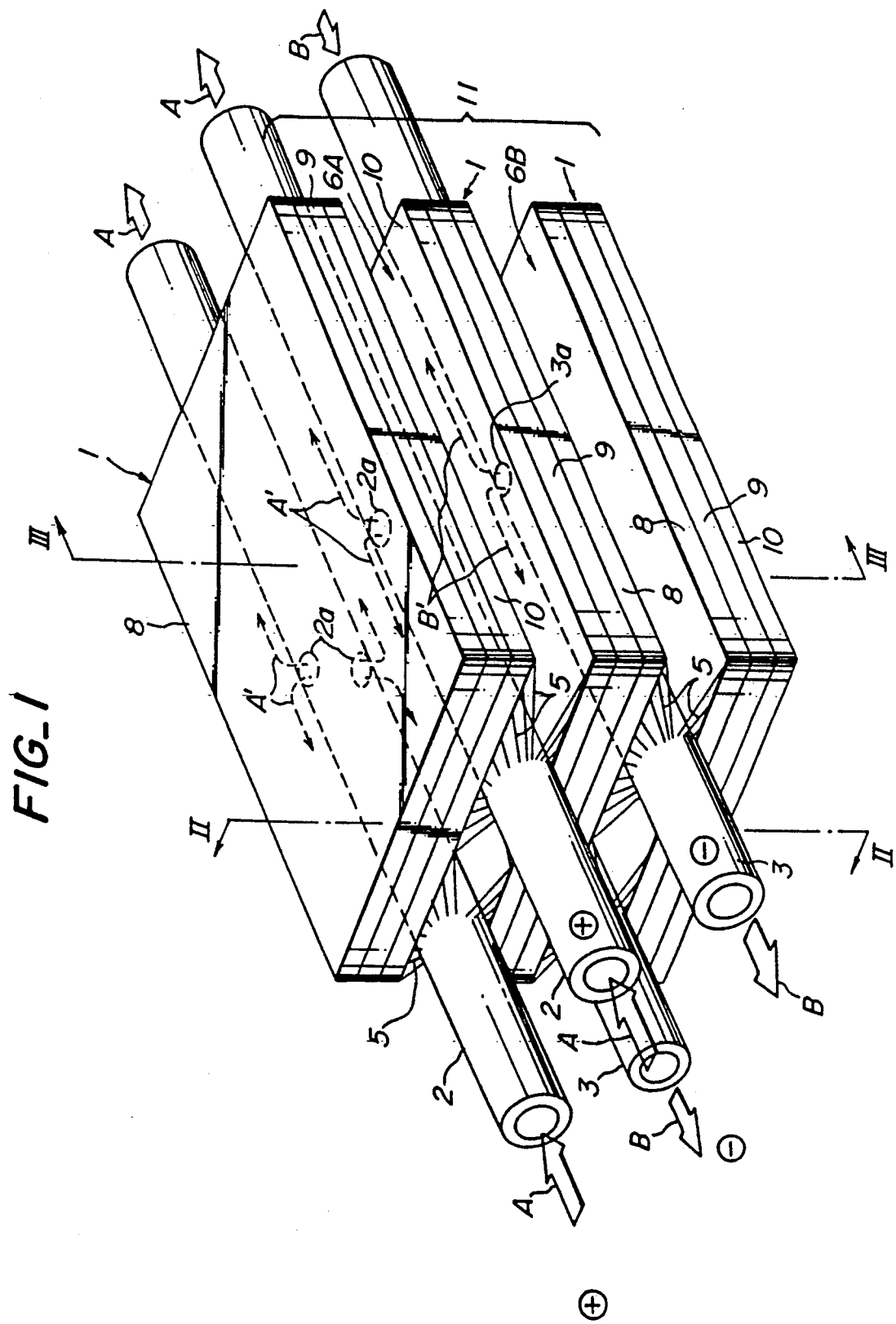
FIG. 1 is a partial cross-sectional perspective view showing a part of an SOFC power generator according to the invention.
Figure 2:
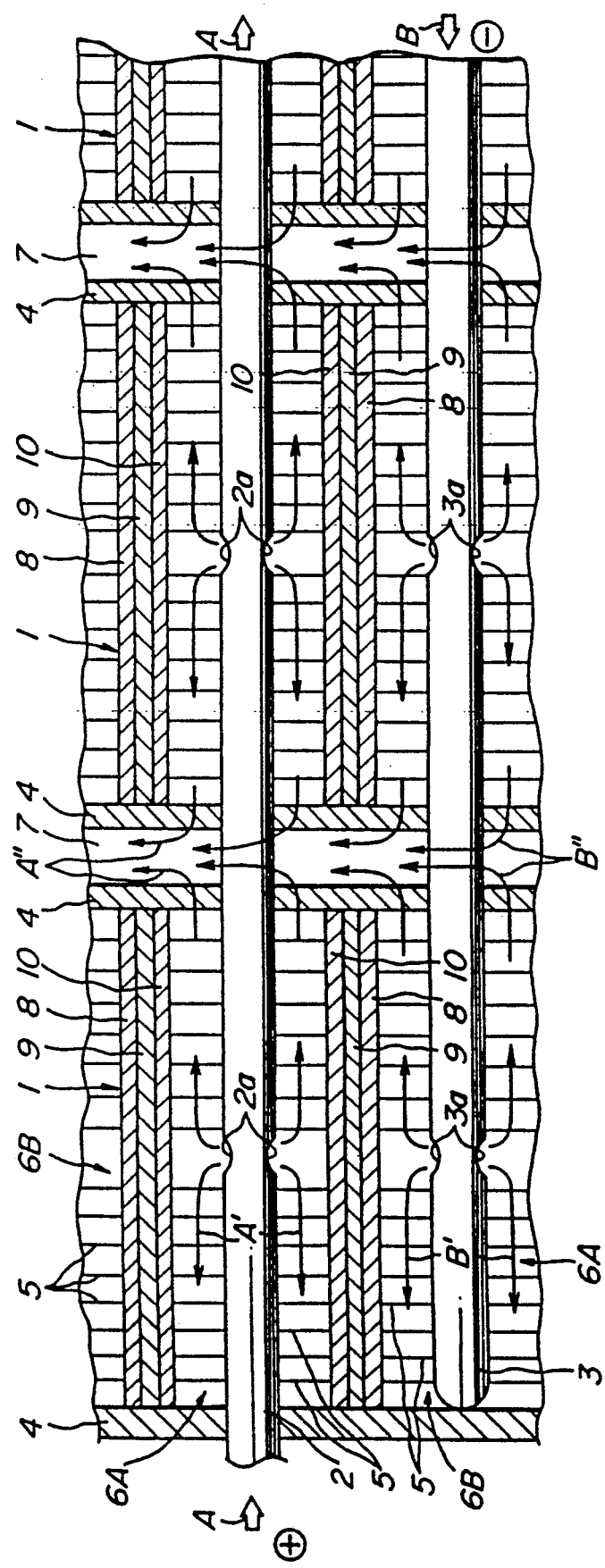
FIG. 2 is a cross sectional view cut along II—II line in FIG. 1.
Figure 3:
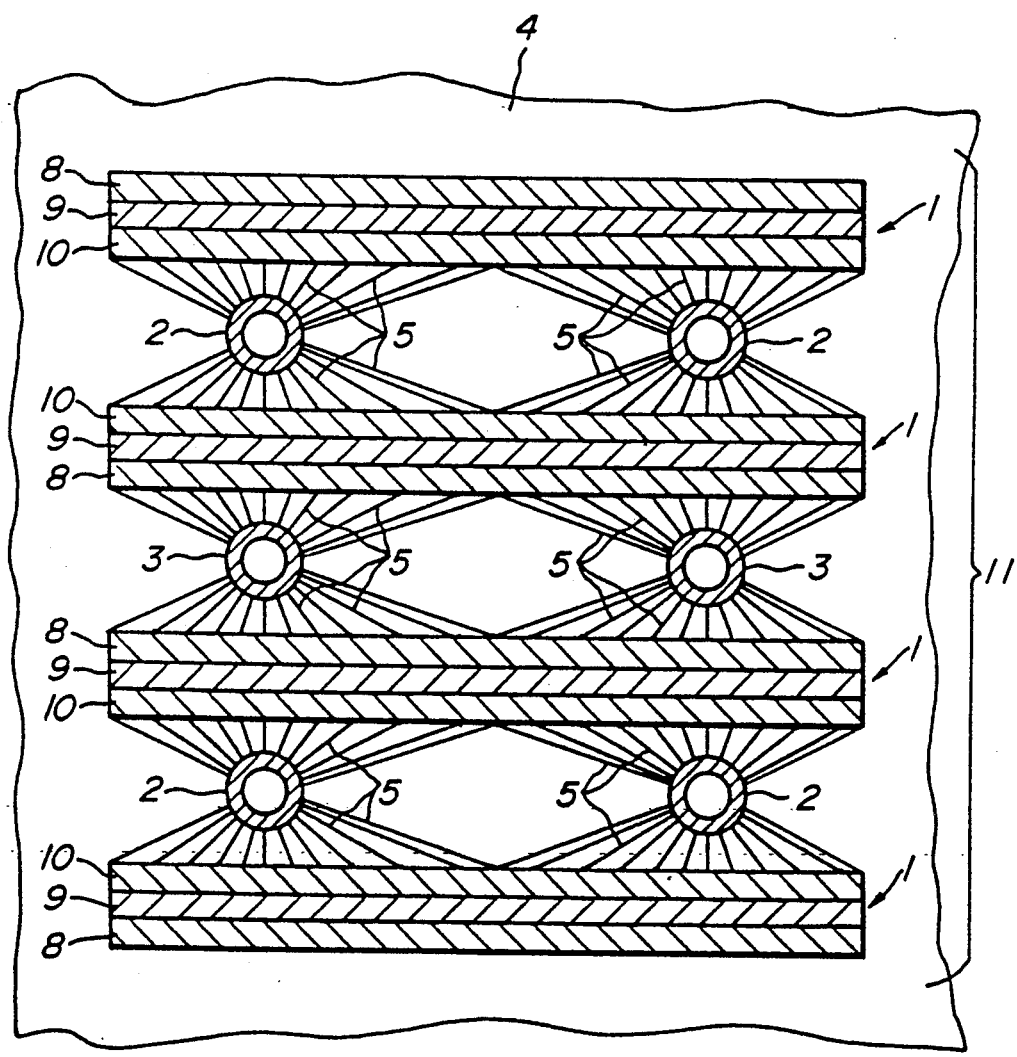
FIG. 3 is a cross sectional view cut along III—III line in FIG. 1.
Figure 4:
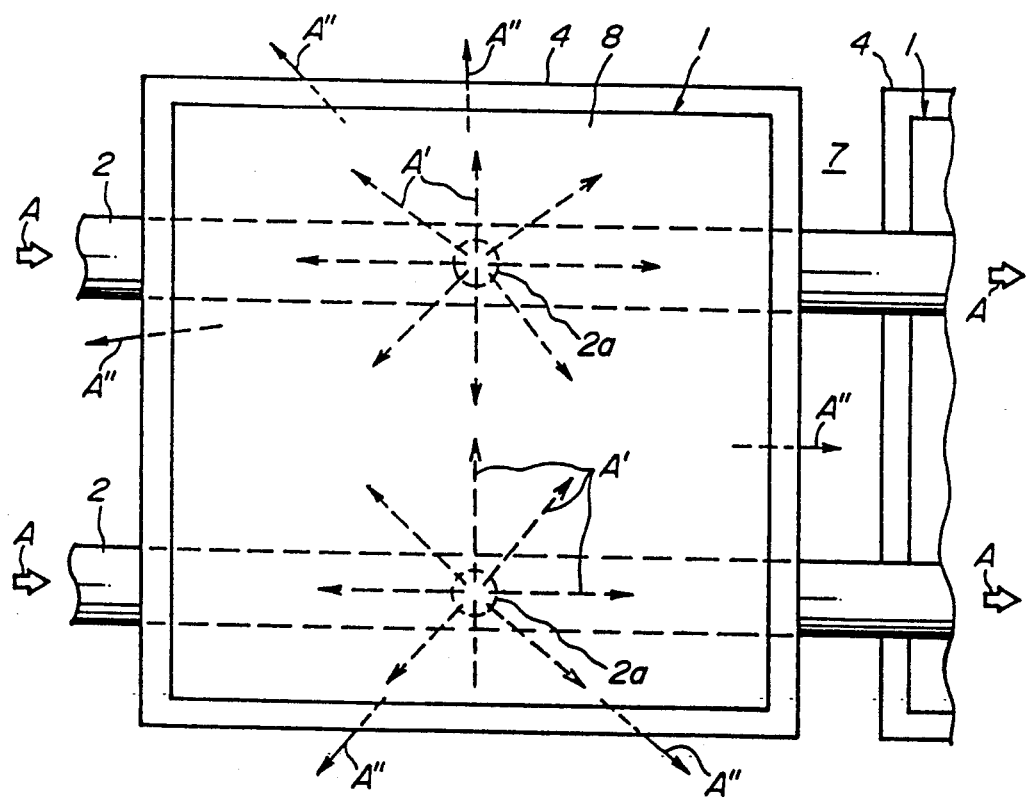
FIG. 4 is a plan view showing the other part of an SOFC power generator according to the invention.

FIG. 1 is a partial cross-sectional perspective view showing a part of an SOFC power generator according to the invention, FIG. 2 is a cross sectional view cut along II—II line in FIG. 1, FIG. 3 is a cross sectional view cut along III—III line in FIG. 1, and FIG. 4 is a plan view showing the other part of an SOFC generator. In FIG. 1 and FIG. 4, a porous partition 4 is omitted. The present invention will be explained with reference to the drawings.

A plate-like SOFC element 1 comprises a plate-like solid-electrolyte partition 9, an air electrode film 10 arranged on on surface of the plate-like SOFC element 1, and a fuel electrode film 8 arranged on the other surface of the plate-like SOFC element. The air electrode film 10 is manufactured from doped or nondoped $LaMnO_3$, $CaMnO_3$, $LaNiO_3$, $LaCoO_3$, $LaCrO_3$, etc. However, it is preferred to use $LaMnO_3$ in which strontium is doped. The plate-like solid-electrolyte partition 9 is generally manufactured from yttrium stabilized zirconia, etc. The fuel electrode film 8 is generally manufactured from nickel-zirconia cermet or cobalt-zirconia cermet.

A plurality of plate-like SOFC elements are arranged parallelly with each other in such a manner that the air electrodes 10 of the adjacent plate-like SOFC elements are opposed to each other with some distance and the fuel electrodes 8 of the adjacent plate-like SOFC elements are opposed to each other with some distance, so as to form an SOFC element array 11. Edge portions of respective SOFC elements 1 are supported by porous partition 4 in a soft manner to define positions therebetween. A first power generating room 6A is formed between opposed air electrodes 10, and a second power generating room 6B is formed between opposed fuel electrode 8. Moreover, the first power generating room 6A and the second power generating room 6B are mutually arranged with each other. An outer surface of respective SOFC element arrays 11 is covered with the porous partition 4, and a plurality of SOFC element arrays 11 are arranged in a matrix manner. Further, a burnt material forming room 7 is formed in a space between adjacent SOFC element arrays 11.

In this embodiment, two conductive oxidizing gas supply tubes 2 are arranged in the first power generating room 6A, and they are arranged through a plurality of the first power generating rooms 6A and the burnt material forming rooms 7.

Also in this embodiment, two conductive fuel gas supply tubes 3 are arranged in the second power generating room 6B, and they are arranged through a plurality of the second power generating rooms 6B and the burnt material forming rooms 7.

These conductive oxidizing gas supply tubes 2 and conductive fuel gas supply tubes 3 are supported respectively by the porous partition 4.

A plurality of needle-like current collecting brushes 5 are fixed to outer surfaces of the conductive oxidizing gas supply tube 2 and the conductive fuel gas supply tube 3, and the other ends of the needle-like current collecting brushes 5 are contacted under pressure with electrode surfaces of the air electrodes 10 or the fuel electrodes 8. The needle-like current collecting brush 5 is preferably made of a heat resistive metal which has an elasticity under high temperatures such as 1000° C. In this manner, the fragile SOFC element is supported by the needle-like current collecting brush 5 and the porous partition 4 arranged around the element. An oxidizing gas supply inlet 2a of the oxidizing gas supply tube 2 is open in a center of the first power generating room 6A, and a fuel gas supply inlet 3a of the fuel gas supply tube 3 is open in a center of the second power generating room 6B.

An oxygen including gas such as air is introduced into the oxidizing gas supply tube 2 as shown by an arrow A and then is discharged into the first power generating room 6A from the oxidizing gas supply inlet 2a, so that gases discharged from the inlets 2a advance radially within the first power generating room 6A as shown by an arrow A'. In the same manner, the oxidizing gas is supplied into all the first power generating rooms 6A of the SOFC element arrays 11.

Moreover, a fuel gas such as hydrogen, carbon monoxide and the like is introduced into the fuel gas supply tube 3 as shown by an arrow B and then is discharged into the second power generating room 6B from the fuel gas supply inlet 3a, so that gases discharged from the inlets 3a advance radially within the second power generating room 6B as shown by an arrow B'. In the same manner, the fuel gas is supplied into all the second power generating rooms 6B of the SOFC element arrays 11

The porous partition 4 is designed to generate a gas flow by a little differential pressure generated between the first power generating room 6A or the second power generating room 6B and the burnt material forming room 7, thereby preventing a back gas flow of the burnt material from the burnt material forming room 7 into respective power generating rooms 6A and 6B. An oxidizing gas after utilizing the power generation is introduced into the burnt material forming room 7 through the porous partition 4 as shown by an arrow A". At the same time, a fuel gas after utilizing the power generation is introduced into the burnt material forming room 7 through the porous partition 4 as shown in an arrow B". Then, the thus introduced fuel gas after the power generation is contacted with the oxidizing gas after the power generation and is fired to pre-heat the gases passing through the gas supply tubes 2 and 3.

In the first power generation room 6A, the oxidizing gas generates an oxygen ion at a boundary between the air electrode 10 and a solid-electrolyte member 9. The thus generated oxygen ion is moved into the fuel electrode 8 through the solid-electrolyte member 9. Then, in the second power generation room 6B, the thus moved oxygen ion is reacted with the fuel and thus electrons are generated and moved into the fuel electrode 8. Further, the thus discharged electrons are collected by the conductive oxidizing gas supply tube 2 and the conductive fuel gas supply tube 3 with the aid of the needle-like current collecting brush 5.

As a result, electric powers are generated by a load connected between the conductive oxidizing ga supply tube 2 as a positive terminal and the conductive fuel gas supply tube 3 as a negative terminal.

The fuel cell generator according to the above embodiment has the following effects.
(1) In order to increase a power generating efficiency of the plate-like SOFC element, it is necessary to increase a power generating area by enlarging a dimension thereof. However, if a dimension of the plate-like SOFC element is enlarged, a temperature gradient and a current density gradient become larger and thus the power generating efficiency becomes bad. Moreover, thermal stresses become larger and thus cracks are generated.

That is to say, in the vicinity of the fuel gas supply inlet, since an amount of fuel contained in the fuel gas is large, electrochemical reactions become active and a temperature rises, and thus the reactions are further promoted. On the other hand, at the other end of the plate-like SOFC element, since an amount of fuel contained in the fuel gas is decreased, electrochemical reactions are not active and a temperature is lowered, and thus the reactions become further inactive. Further, the fuel gas after the oxidizing reaction, in which an amount of fuel contained therein is decreased, includes a large amount of $CO_2$ component, vapor component etc., and these components function to prevent the electrochemical reaction by being adhered to the electrode surfaces. Therefore, a temperature is further decreased. This tendency becomes in excess as a dimension of the plate-like SOFC element becomes larger.

On the contrary, according to the invention, the oxidizing gas supply inlet 2a of the oxidizing gas supply tube 2 passing through the first power generating room 6A is provided substantially at the center of the first power generating room 6A, and the the fuel gas supply inlet 3a of the fuel gas supply tube 3 passing through the second power generating room 6B is provided substantially at the center of the second power generating room 6B. Therefore, since gases discharged from the inlets 2a and 3a provided at the center of respective power generating rooms 6A and 6B advance radially in the first and second power generating rooms 6A and 6B especially as shown in FIG. 4, a passing distance of gases from each gas supply inlet to the burnt material forming room 7 is very short as compared with the prior art wherein gas crosses the power generating room. In this manner, since a heat conductive resistance between a high temperature portion and a low temperature portion becomes small and a temperature gradient from a portion near the gas supply inlets 2a and 3a to the burnt material forming room 7 can be lowered, heat stresses can be made smaller and a power generating efficiency becomes uniform and improved.

(2) Since the needle-like current collecting member 5 is contacted under pressure over a substantially whole electrode surfaces of the air electrode 10 and the fuel electrode 8, current is collected in a perpendicular direction with respect to the electrode film surfaces and thus a passing distance of current in the electrode film having a large relative resistivity can be shortened. Therefore, it is possible to make a power loss low and thus a power generating efficiency can be extraordinarily improved.

(3) Since all the surfaces of the fragile SOFC element are supported by the flexible needle-like current collecting members in a soft and uniform manner under small pressures, excessive stresses are not applied to the SOFC element, and thus a reliability of the fuel cell generator can be improved.

(4) Since both of oxidizing gas and fuel gas are discharged from a substantially center portion of the power generating rooms and exhaust gasses are discharged from circumferential portions of the power generating rooms, spaces between the SOFC elements are not fixed for sealing. Therefore, stresses due to fixing operations are not generated in the SOFC element, and thus a reliability of the fuel cell generator can be improved.

(5) Generally, Ni felt is used for the current collecting member, but it is deteriorated during use under high temperatures, thereby generating a contact miss with respect to the electrodes. Therefore, a power generating efficiency is lowered.

Contrary to this, according to the invention, since the needle-like current collecting member 5 has an elasticity and is contacted under pressures with substantially the whole surface of the air electrode 10 and the fuel electrode 8, contacted areas can be made larger and a load per one current collecting member can be lowered, thereby stresses due to supporting operation can be reduced. Therefore, a bending and a miss contacting can be prevented, and thus a decrease of power generating efficiency can be eliminated.

(6) Since a long oxidizing gas supply tube 2 and a long fuel gas supply tube 3 are passing through a plurality of power generating rooms, if an oxidizing gas is supplied into one oxidizing tube 2 and a fuel gas is supplied into one fuel gas supply tube 3, an oxidizing gas and a fuel gas can be supplied respectively into a plurality of first power generating rooms 6A and second power generating rooms 6B at the same time. Therefore, it is not necessary to arrange an oxidizing gas supply tube and a fuel gas supply tube in every power generating room.

In the above embodiment, various modifications are possible as follows.

(a) In the above embodiment, currents are collected directly from the conductive gas supply tubes 2 and 3 preferably made of heat resistive metal etc., but it is possible to use a gas supply tube having a two layer construction in which a base portion of the gas supply tube is made of nonconductive heat resistive materials such as ceramics etc. and a conductive layer made of conductive materials such as heat resistive metal etc. are arranged on an outer surface of the base portion. In this case, the conductive layer and the surface of the air electrode or the fuel electrode are electrically contacted with the aid of the needle-like current collecting member 5.

Figure 5:
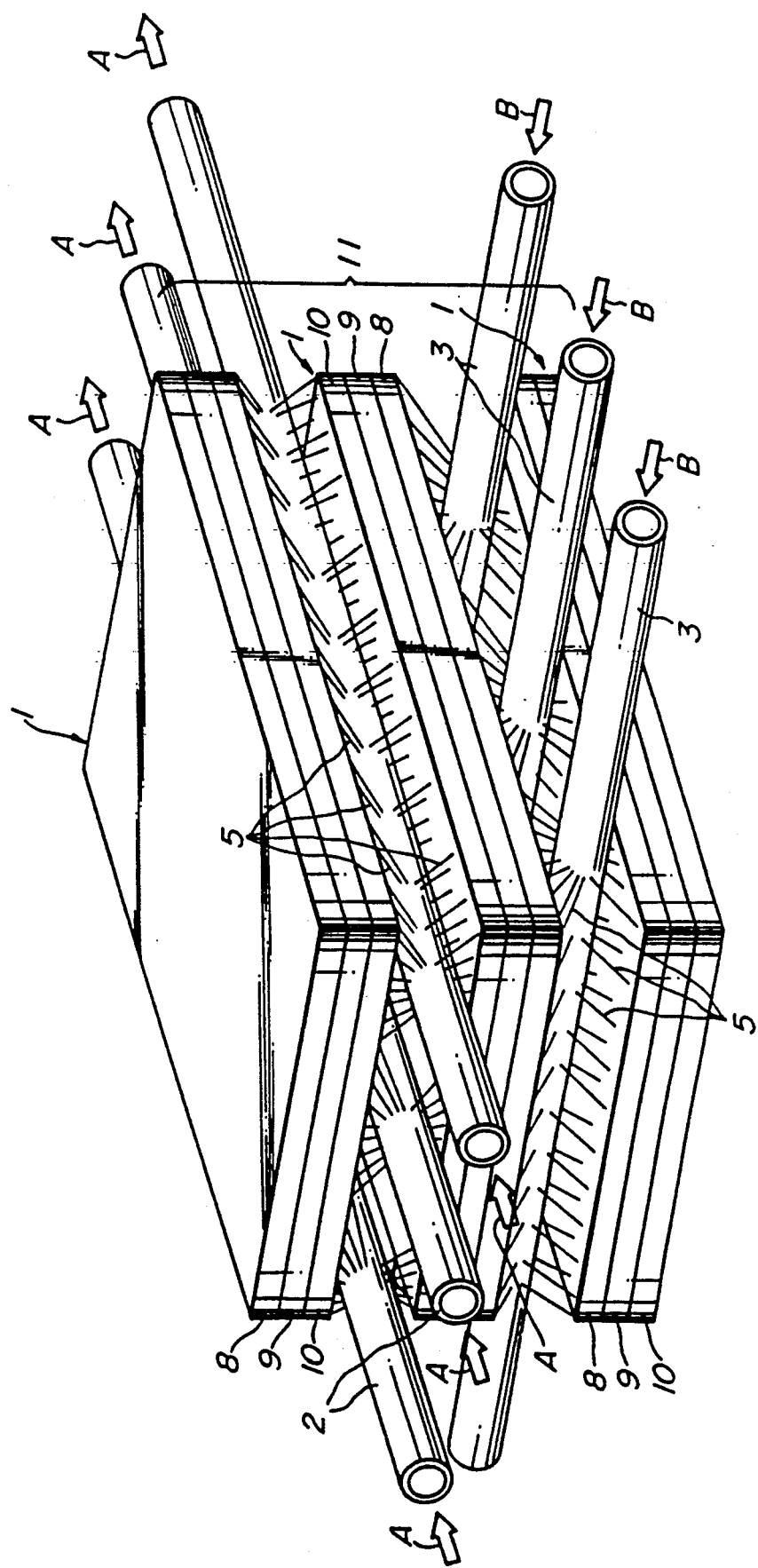
FIG. 5 is a partial cross-sectional perspective view illustrating a part of the other SOFC power generator according to the invention.

In the above embodiment, two conductive or nonconductive oxidizing gas supply tubes are arranged in the first power generating room 6A and also two conductive or nonconductive fuel gas supply tubes are arranged in the second power generating room 6B, but the number of the gas supply tubes is not limited to two and us is made of one tube or more than three tubes. Moreover, in the oxidizing gas supply tube and the fuel gas supply tube passing respectively through the first power generating room 6A and the second power generating room 6B, the number, dimension, shape and position of the oxidizing gas supply inlet and the fuel gas supply inlet are varied arbitrarily. Further, a gas flow direction is not limited to a parallel direction, but the oxidizing gas flow direction can be set perpendicularly with respect to the fuel gas flow direction as shown in FIG. 5.

It should be noted that the number of SOFC elements which construct respective SOFC element arrays 11 can be varied in various manners and the number of the SOFC element arrays also can be varied.

(b) As shown in FIGS. 1 to 5, instead of using the needle-like current collecting member 5, a heat resistive metal electrode having a comb shape, a current collecting member made of metal wool, etc. can be used and further the other current collecting member having low stiffness and elasticity also can be used. Moreover, it is possible to use different current collecting members for the air electrode and the fuel electrode. Further, instead of using the needle-like current collecting member 5, use is made of a current collecting member made of Ni felt or the other felts and a substantially whole electrode surfaces are contacted with the current collecting member in a multi-point contact manner.

In this embodiment, as for the multi-point current collecting member, use is made of heat resistive metals, but use may be made of the other conductive materials such as conductive ceramics, metal coated ceramics.

(c) In the above embodiment, all the circumferential portions of the power generating room are surrounded by the porous partitions 4, but it is not necessary to surround all the circumferential portions. That is to say, the porous partition 4 may be arranged only to the opposed two circumferential portions, or instead of using the porous partition 4 the conductive gas supply tubes 2 and 3 may be fixed and respective SOFC elements 1 may be directly supported via the needle-like current collecting member 5.

Figure 6:
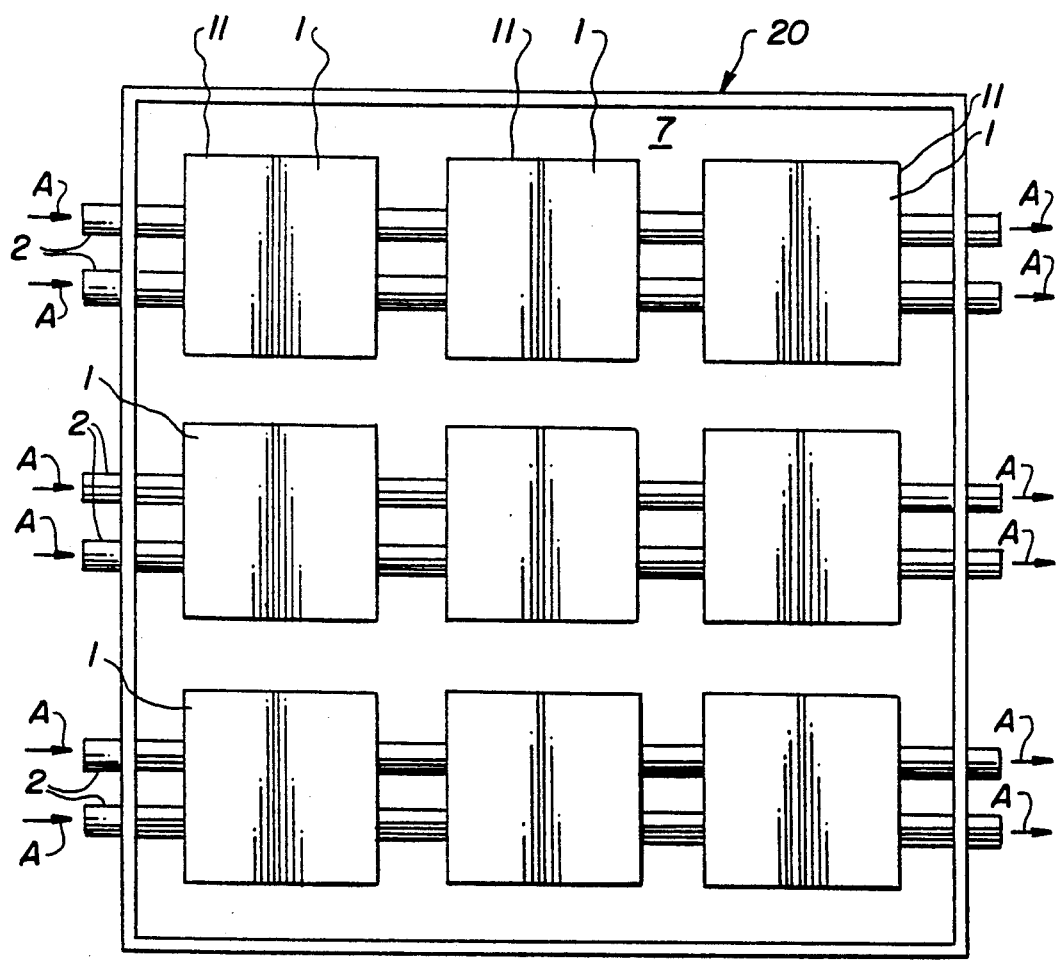
FIG. 6 is a plan view depicting one whole arrangement of the other SOFC power generator.

Moreover, as shown in FIG. 6, respective SOFC element arrays 11 are arranged in a matrix manner, respective SOFC elements may be supported via the conductive gas supply tubes 2 and 3 and the needle-like current collecting member 5, and a whole fuel cell generator are accommodated in an airtight vessel 20.

Further, in addition to the porous partition 4, a supporting baffle or a floating baffle contacting with the element in a soft manner may be installed.

(d) In FIG. 1, respective SOFC elements 1 are supported horizontally, but it is possible to support the whole fuel cell generator vertically or to support it in an inclined manner by a predetermined angle.

(e) In the above embodiment, the plate-like solid-electrolyte partition acts as a stiff member and thus the fuel cell generator can support itself, but it is possible to further use a porous and conductive supporting plate on which the SOFC element is formed.

The porous and conductive supporting plate can be manufactured from for example Sr doped $LaMnO_3$. Moreover, a shape of the plate-like SOFC element is not limited to a square shape and a rectangular shape, but use may be made of a triangular shape, a hexagonal shape, a circular shape, etc. Moreover, as for a plate shape of the plate-like SOFC element, use may be made of a wave shape, a cone shape, a pyramidal shape, a spherical shape and the like.

According to a first aspect of the invention, since an oxidizing gas is supplied through an oxidizing gas supply inlet provided at a substantially center of the first power generating room and a fuel gas is supplied through a fuel gas supply inlet provided at substantially the center of the second power generating room, the oxidizing gas and the fuel gas respectively discharged from the oxidizing gas supply inlet and the fuel gas supply inlet advance radially in respective power generating rooms. Therefore, as compared with the conventional embodiment wherein these gases are crossed in the power generating room, a gas passing distance from respective gas supply inlets to the burnt material generating room can be extraordinarily shortened. As a result, since a temperature gradient in the SOFC element can be shortened, thermal stresses applied to the SOFC element can be reduced, thereby preventing a crack generation. Moreover, a power generating efficiency can be made uniform and can be improved.

Moreover, since a multi-point current collecting member is contacted across the substantially whole electrode surface of the air electrode and the fuel electrode, current is collected in a perpendicular direction with respect to respective electrode films and thus a voltage loss due to internal resistances of the electrode films can be reduced. Therefore, a power generating efficiency can be extraordinarily improved. Further, since the SOFC element is supported by a multi-point current collecting member in a soft manner, a damage of the SOFC element due to stresses can be extraordinarily reduced.

Figure 7:
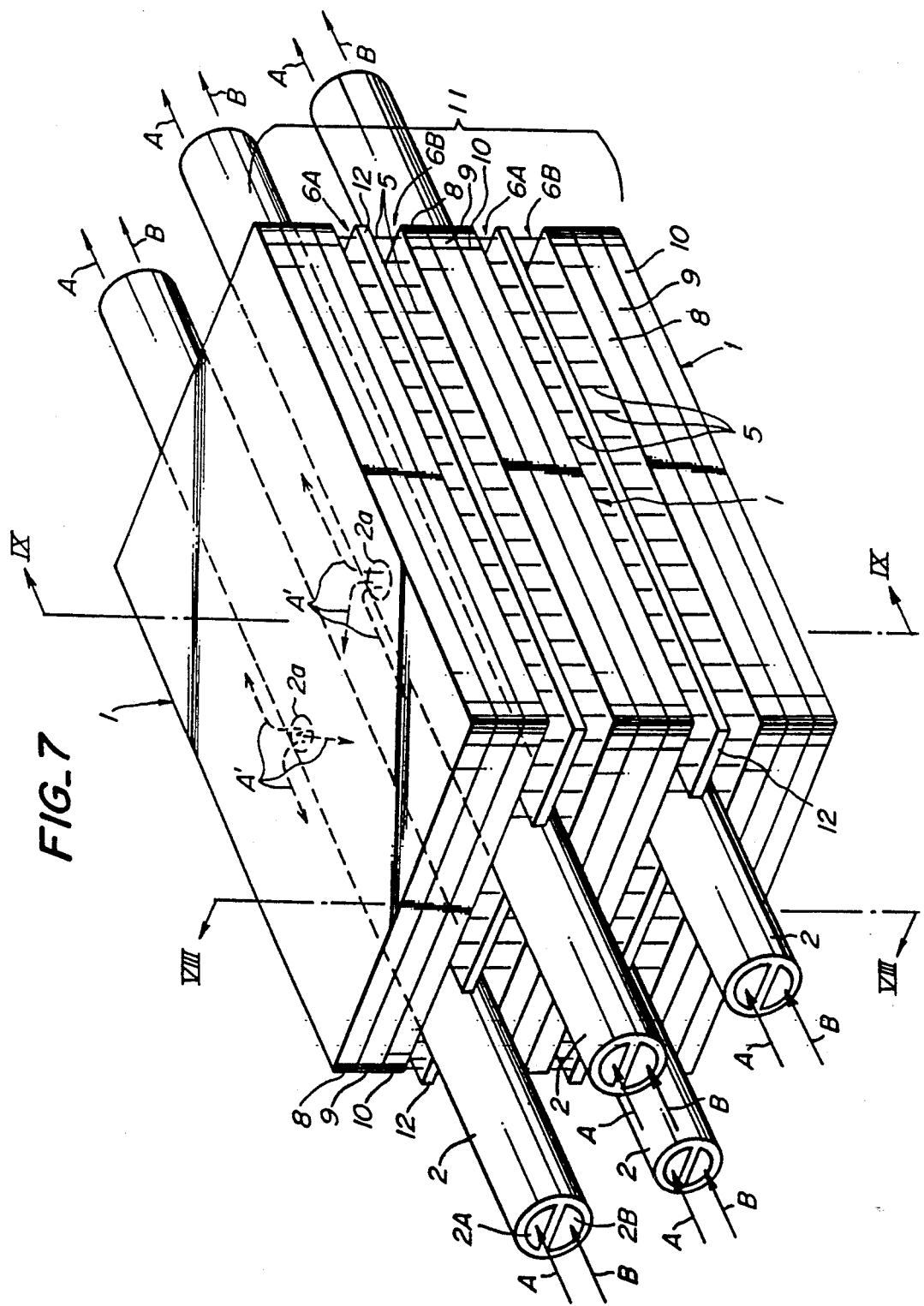
FIG. 7 is a partial cross-sectional perspective view showing a part of the other embodiment of an SOFC power generator according to the invention.
Figure 8:
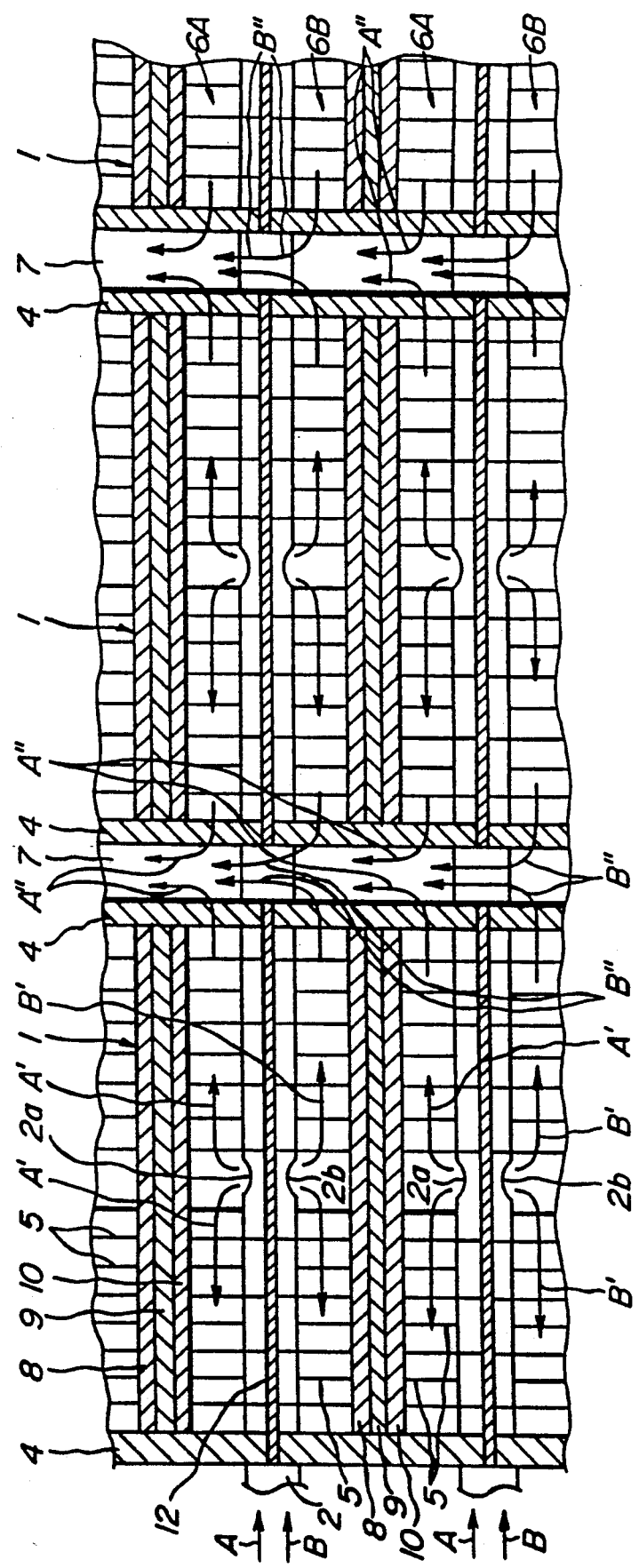
FIG. 8 is a cross sectional view cut along II—II line in FIG. 7.
Figure 9:
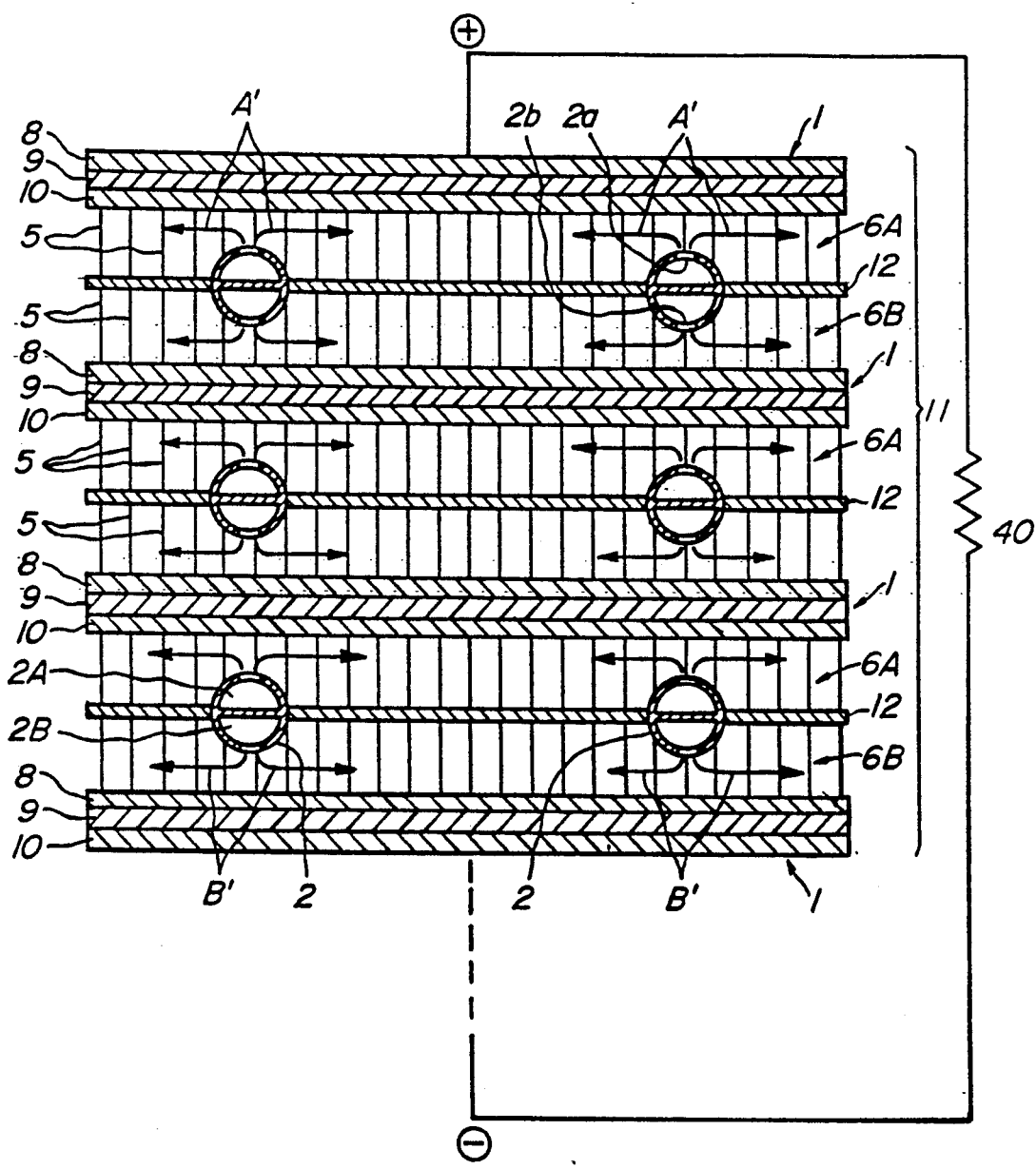
FIG. 9 is a cross sectional view cut along III—III line in FIG. 7.

FIG. 7 is a partial cross-sectional perspective view showing a part of the other embodiment of an SOFC power generator according to the invention, FIG. 8 is a cross sectional view cut along II—II line in FIG. 7, and FIG. 9 is a cross sectional view cut along III—III line in FIG. 7. In FIG. 7 and FIG. 9, a porous partition 4 is omitted.

A plate-like SOFC element 1 comprises a plate-like solid-electrolyte partition 9, an air electrode film 10 arranged on one surface of the plate-like SOFC element 1, and a fuel electrode film 8 arranged on the other surface of the plate-like SOFC element. The air electrode film 10 is manufactured from doped or nondoped $LaMnO_3$, $CaMnO_3$, $LaNiO_3$, $LaCoO_3$, $LaCrO_3$, etc. However, it is preferred to use $LaMnO_3$ in which strontium is added. The plate-like solid-electrolyte partition 9 is generally manufactured from yttrium stabilized zirconia, etc. The fuel electrode film 8 is generally manufactured from nickel-zirconia cermet or cobalt-zirconia cermet.

Respective plate-like SOFC elements are arranged in such a manner that each fuel electrode 8 is faced upward (or downward) as shown in figures. Moreover, a plurality of plate-like SOFC elements are arranged parallelly with each other in such a manner that the air electrodes 10 are opposed to the fuel electrodes 8 with some distance, so as to form an SOFC element array 1. Moreover, circumferential edge portions of respective SOFC elements 1 are supported by porous partitions 4 in a soft manner to define positions therebetween. Outer peripheral portions of respective SOFC element arrays 11 are surrounded by the porous partitions 4, and a plurality of SOFC element arrays 11 are arranged in a matrix manner, thereby forming a burnt material forming room 7 in a space between adjacent SOFC element arrays 11.

The fuel electrode 8 of respective SOFC elements 1 is isolated from the air electrode 10 of the adjacent SOFC element 1, and a space is generated therebetween. In this space, an airtight conductive partition 12 is arranged parallelly with respect to respective SOFC elements by being supported with the aid of the porous partition 4. The airtight conductive partition 12 functions to form a first power generating room 6A positioned between the air electrode 10 and the partition 12 and to form a second power generating room 6B positioned between the fuel electrode 8 and the partition 12.

Moreover, two gas supply tubes 2 facing both of the first power generating room 6A and the second power generating room 6B ar arranged in the partition 2, and they are passed through from one end to the other end of the plate-like SOFC element 1. In this embodiment, the number of the gas supply tube is two in one SOFC element 1, but the number can be varied arbitrarily. The gas supply tubes 2 are respectively passed through a plurality of the power generating rooms 6A, 6B and the burnt material forming rooms 7, and are supported by the porous partitions 4.

In the gas supply tube 2, there is arranged a partition 5 to form an oxidizing gas supply path 2A and a fuel gas supply path 2B. At a portion of the gas supply tube 2 corresponding to substantially the center of the SOFC element 1, there are arranged an oxidizing gas supply inlet 2a facing upward to the first power generating room 6A and a fuel gas supply inlet 2b facing downward to the second power generating room 6B as shown in FIGS. 8 and 9.

An oxygen including gas such as air etc. is first supplied into the oxidizing gas supply path 2A as shown by an arrow A, and is then discharged into the power generating room 6A from the oxidizing gas supply inlet 2a by a radially advancing manner as shown in an arrow A'. At the same time, the oxygen including gas is supplied into all the other first power generating rooms 6A of respective SOFC element arrays 11 consisting of a plurality of the SOFC elements.

Moreover, a fuel gas such as hydrogen, carbon monoxide and the like is first supplied into the fuel gas supply path 2B as shown by an arrow B, and is then discharged into the second power generating room 6B from the fuel gas supply inlet 2b in a radially advancing manner as shown in an arrow B'. At the same time, the fuel gas is supplied into all the other second power generating rooms 6B of respective SOFC element arrays 11 in the same manner.

The porous partition 4 is designed to make a gas flow by a little differential pressure generated between the first power generating room 6A or the second power generating room 6B and the burnt material forming room 7, thereby preventing a back gas flow of the burnt material from the burnt material forming room 7 into respective power generating rooms 6A and 6B. An oxidizing gas after utilizing the power generation is introduced into the burnt material forming room 7 through the porous partition 4 as shown by an arrow A". At the same time, a fuel gas after utilizing the power generation is introduced into the burnt material forming room 7 through the porous partition 4 as shown by an arrow B". Then, the thus introduced fuel gas after the power generation is contacted with the oxidizing gas after the power generation and is fired to pre-heat the gases passing through the gas supply paths 2A and 2B.

A plurality of needle-like current collecting brushes 5 are fixed to both surfaces of the conductive airtight partition 12, and the other ends of the needle-like current collecting brushes 5 are contacted under pressure with an electrode surface of the air electrode 10 or the fuel electrode 8. The needle-like current collecting brush 5 is preferably made of a heat resistive metal which has an elasticity under high temperatures such as 1000° C.

In this manner, the fragile SOFC element is supported by the needle-like current collecting brush 5 and the partition 4 arranged around the element.

In the first power generating room 6A, the oxidizing gas generates an oxygen ion at a boundary between the air electrode 10 and a solid-electrolyte member 9. The thus generated oxygen ion is moved into the fuel electrode 8 through the solid-electrolyte member 9. Then, in the second power generating room 6B, the thus moved oxygen ion is reacted with the fuel and thus electrons are generated and moved into the fuel electrode 8.

In the SOFC element arrays, adjacent air electrode and fuel electrode are connected in series with the aid of the needle-like current collecting brush 5 and the conductive airtight partition 12, and thus electric powers are generated by a load connected between the air electrode and the fuel electrode.

The fuel cell generator according to the above embodiment has the following effects in addition to the effects (1)-(6) mentioned previously as the other embodiment.

(7) Since the air electrode 10 and the conductive airtight partition 12 are electrically connected with the aid of the needle-like current collecting brush 5 and also the fuel electrode 8 and the conductive airtight partition 12 are electrically connected with the aid of the needle-like current collecting brush 5, the air electrode 10 is electrically connected to the fuel electrode 8, and thus it is possible to flow current between adjacent plate-like SOFC elements. That is to say, as shown in FIG. 9, if a load 40 is arranged between the uppermost plate-like SOFC element and the lowermost plate-like element, both of which construct a plate-like SOFC element array, it is possible to achieve the fuel cell generator in which plate-like SOFC elements are connected in series, and thus powers can be obtained at the same time in an easy manner.

Moreover, if the number of the series plate-like SOFC elements is varied, it is possible to vary the generated voltage in an easy manner.

In the above embodiment, various modifications are possible as follows in addition to the modifications (a)-(e) mentioned in the other embodiment.

(f) In the above embodiment, it is possible to construct the gas supply tube by conductive materials such as heat resistive metal or the like or by non-conductive materials such as ceramics etc. Moreover, in the above embodiment, the oxidizing gas supply path and the fuel gas supply path are arranged in one gas supply tube, but it is possible to use an oxidizing gas supply tube passing through the first power generating room and a fuel gas supply tube passing through the second power generating room.

Further, a gas flow direction is not limited to a parallel direction, but the oxidizing gas flow direction can be perpendicular with respect to the fuel gas direction as shown in FIG. 10.

According to a second aspect of the invention, as compared with the first aspect of invention, since a space formed between the air electrode of the respective SOFC elements and the fuel electrode of the adjacent SOFC elements is isolated by the conductive airtight partition and both of the air electrode and the fuel electrode are electrically connected to the conductive airtight partition, it is possible to connect adjacent SOFC elements in series. Therefore, if the load is arranged between the uppermost SOFC element and the lowermost SOFC element, generated power can be obtained at the same time in an easy manner.

What is claimed is:

1. A fuel cell generator comprising:
at least one fuel cell element array including a plurality of fuel cell elements arranged spaced apart from each other, each fuel cell element comprising a plate-like solid-electrolyte partition having ion conductivity, an air electrode arranged on one side surface of said partition, and a fuel electrode arranged on the other side surface of said partition;

a first power generating room in communication with said air electrode;

a second power generating room in communication with said fuel electrode;

an oxidizing gas supply path comprising an oxidizing gas supply inlet open to said first power generating room for supplying an oxidizing gas into said first power generating room to contact said air electrode;

a fuel gas supply path comprising a fuel gas supply inlet open to said second power generating room for supplying a fuel gas into said second power generating room to contact said fuel electrode;

a first multi-contact current collecting member contacting substantially the entire surface of said air electrode and connected at least electrically to said oxidizing gas supply path; and a second multi-contact current collecting member contacting substantially the entire surface of said fuel electrode and connected at least electrically to said fuel gas supply path.

2. A fuel cell generator according to claim 1, wherein said fuel cell elements are arranged such that surfaces thereof are parallel, said air electrodes of adjacent fuel cell elements are opposed to and spaced from each other, and said fuel electrodes of adjacent fuel cell elements are opposed to and spaced from each other.

3. A fuel cell generator according to claim 1, wherein said fuel cell elements are arranged such that surfaces thereof are parallel, and said air electrodes and said fuel electrodes of adjacent fuel cell elements are opposed to each other, and a conductive airtight partition is arranged between adjacent air and fuel electrodes.

4. A fuel cell generator according to claim 3, wherein said oxidizing gas supply path and said fuel gas supply path are provided in one gas supply tube which is partitioned by said conductive airtight partition, such that said conductive airtight partition forms part of said oxidizing and fuel gas supply paths.

* * * * *